US012374194B2

(12) United States Patent
Idris

(10) Patent No.: US 12,374,194 B2
(45) Date of Patent: *Jul. 29, 2025

(54) DYNAMIC GAME FLOW MODIFICATION IN ELECTRONIC WAGERING GAMES

(71) Applicant: IGT, Las Vegas, NV (US)

(72) Inventor: Fayez Idris, Dieppe (CA)

(73) Assignee: IGT, LasVegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/658,150

(22) Filed: May 8, 2024

(65) Prior Publication Data

US 2024/0290173 A1 Aug. 29, 2024

Related U.S. Application Data

(63) Continuation of application No. 17/710,117, filed on Mar. 31, 2022, now Pat. No. 11,995,958, which is a continuation of application No. 16/936,626, filed on Jul. 23, 2020, now Pat. No. 11,321,996, which is a (Continued)

(51) Int. Cl.
*G07F 17/32* (2006.01)
*G07F 17/34* (2006.01)

(52) U.S. Cl.
CPC ...... *G07F 17/3267* (2013.01); *G07F 17/3223* (2013.01); *G07F 17/3227* (2013.01); *G07F 17/3237* (2013.01); *G07F 17/3244* (2013.01); *G07F 17/3262* (2013.01); *G07F 17/34* (2013.01)

(58) Field of Classification Search
CPC ... G07F 17/3244; G07F 17/3262; G07F 17/34
See application file for complete search history.

(56) References Cited

U.S. PATENT DOCUMENTS 5,277,424 A 1/1994 Wilms
6,068,552 A 5/2000 Walker
6,110,041 A 8/2000 Walker
(Continued)

FOREIGN PATENT DOCUMENTS

AU 2005208268 A1 1/2011
CA 2601560 A1 10/2006
(Continued)

OTHER PUBLICATIONS

United States Patent and Trademark Office, Office Action dated Aug. 25, 2014, issued on U.S. Appl. No. 13/861,282.
(Continued)

*Primary Examiner* — Steven J Hylinski
(74) *Attorney, Agent, or Firm* — Sage Patent Group

(57) ABSTRACT

A wagering game operates according to a set of game rules including game flow rules that define a sequence of game events that are presented to a player in a course of operation of the wagering game, a math engine that governs probabilities of pseudorandom events that can occur in the course of operation of the wagering game, and a pay table that defines winning events that can occur in the course of operation of the wagering game and corresponding payouts that are made to the player upon occurrence of the wining events. The method determines a player game play preference of the player associated with playing the wagering game on the EGM, and adjusts the game flow rules in response to the determined player game play preference.

17 Claims, 14 Drawing Sheets

Related U.S. Application Data continuation of application No. 16/203,539, filed on Nov. 28, 2018, now abandoned.

(56) References Cited

U.S. PATENT DOCUMENTS

| | | | |
|---|---|---|---|
| 6,607,441 | B1 | 8/2003 | Acres |
| 6,719,631 | B1 | 4/2004 | Tulley |
| 6,846,238 | B2 | 1/2005 | Wells |
| 7,033,276 | B2 | 4/2006 | Walker |
| 7,326,115 | B2 | 2/2008 | Baerlocher |
| 7,326,116 | B2 | 2/2008 | O'Donovan |
| 7,384,338 | B2 | 6/2008 | Rothschild et al. |
| 7,427,233 | B2 | 9/2008 | Walker |
| 7,713,119 | B2 | 5/2010 | Pacey et al. |
| 7,722,453 | B2 | 5/2010 | Lark |
| 7,804,995 | B2 | 9/2010 | Lipton et al. |
| 7,883,413 | B2 | 2/2011 | Paulsen |
| 8,235,811 | B2 | 8/2012 | Joshi et al. |
| 8,727,892 | B1 | 5/2014 | Chun |
| 9,079,098 | B2 | 7/2015 | Kumar et al. |
| 9,082,261 | B2 | 7/2015 | Caputo |
| 9,084,932 | B2 | 7/2015 | Gadher et al. |
| 9,251,647 | B2 | 2/2016 | Nelson |
| 9,299,215 | B2 | 6/2016 | Gagner |
| 2002/0122585 | A1 | 9/2002 | Swift et al. |
| 2002/0142825 | A1 | 10/2002 | Lark et al. |
| 2003/0032479 | A1 | 2/2003 | LeMay et al. |
| 2003/0064805 | A1 | 4/2003 | Wells |
| 2003/0078101 | A1 | 4/2003 | Schneider et al. |
| 2003/0176218 | A1 | 9/2003 | LeMay |
| 2003/0199295 | A1 | 10/2003 | Vancura |
| 2004/0218269 | A1 | 11/2004 | Divelbiss et al. |
| 2004/0224753 | A1 | 11/2004 | O'Donovan |
| 2005/0020278 | A1 | 1/2005 | Krumm et al. |
| 2005/0117637 | A1 | 6/2005 | Routhier et al. |
| 2005/0190180 | A1 | 9/2005 | Jinn et al. |
| 2007/0054738 | A1 | 3/2007 | Muir |
| 2007/0219000 | A1 | 9/2007 | Aida |
| 2007/0296859 | A1 | 12/2007 | Suzuki |
| 2008/0020845 | A1 | 1/2008 | Low et al. |
| 2008/0032787 | A1 | 2/2008 | Low et al. |
| 2008/0096650 | A1 | 4/2008 | Baerlocher |
| 2008/0254862 | A1 | 10/2008 | Mattice |
| 2008/0268959 | A1 | 10/2008 | Bryson et al. |
| 2008/0318684 | A1 | 12/2008 | Rofougaran |
| 2009/0124350 | A1 | 5/2009 | Iddings |
| 2010/0267439 | A1 | 10/2010 | Engleman et al. |
| 2010/0298040 | A1 | 11/2010 | Joshi et al. |
| 2010/0317435 | A1 | 12/2010 | Velu |
| 2011/0032329 | A1 | 2/2011 | Bauza et al. |
| 2011/0045891 | A1 | 2/2011 | Ansari |
| 2011/0244952 | A1 | 10/2011 | Schueller |
| 2011/0298795 | A1 | 12/2011 | Van Der Heijden et al. |
| 2012/0108309 | A1 | 5/2012 | Aoki |
| 2012/0165101 | A1 | 6/2012 | Krishnamoorthy et al. |
| 2012/0264504 | A1 | 10/2012 | Gagner |
| 2013/0019024 | A1 | 1/2013 | Sheth et al. |
| 2013/0093752 | A1 | 4/2013 | Yuan |
| 2013/0184070 | A1 | 7/2013 | Gadher et al. |
| 2013/0204923 | A1 | 8/2013 | Gibson |
| 2013/0281189 | A1 | 10/2013 | Gagner |
| 2013/0123021 | A1 | 11/2013 | Stubb |
| 2020/0168045 | A1 | 5/2020 | Idris |

FOREIGN PATENT DOCUMENTS

| | | | |
|---|---|---|---|
| WO | 2002005229 | A2 | 1/2002 |
| WO | 2002077935 | A2 | 10/2002 |
| WO | 2004012833 | A2 | 2/2004 |
| WO | 2008118800 | A1 | 10/2008 |
| WO | 2009097538 | A1 | 8/2009 |
| WO | 2013159688 | A1 | 10/2013 |

OTHER PUBLICATIONS

Patent Cooperation Treaty, Written Opinion and International Search Report dated Oct. 30, 2013, issued on PCT Application No. PCT/CA2013/000636.

United States Patent and Trademark Office, Office Action dated Aug. 21, 2014, issued on U.S. Appl. No. 13/738,780.

DYNAMIC GAME FLOW MODIFICATION IN ELECTRONIC WAGERING GAMES

CROSS REFERENCE TO RELATED APPLICATIONS

This application is a Continuation of U.S. patent application Ser. No. 17/710,117, filed Mar. 31, 2022, which is a Continuation of U.S. patent application Ser. No. 16/936,626, filed Jul. 23, 2020, which is a Continuation of U.S. patent application Ser. No. 16/203,539, filed Nov. 28, 2018, the disclosures and content of each of which are incorporated by reference herein in their entirety.

BACKGROUND

The disclosure relates to systems and methods for providing wagering games on electronic gaming machines. In particular, systems and methods are provided for automated identification of gaming preferences and customization of games to a player based on the identified gaming preferences.

Electronic and electro-mechanical gaming machines (EGMs) are systems that allow users to place a wager on the outcome of a random event, such as the spinning of mechanical or virtual reels or wheels, the playing of virtual cards, the rolling of mechanical or virtual dice, the random placement of tiles on a screen, etc. Modern EGMs are typically controlled by a microprocessor that executes computer program instructions that implement game play rules, display game screens, and allow player interaction by controlling input and output devices of the EGM in accordance with the game play rules.

BRIEF SUMMARY

An electronic gaming machine (EGM) according to some embodiments includes a processor circuit, and a memory coupled to the processor circuit. The memory includes machine-readable instructions that, when executed by the processor circuit cause the processor circuit to initiate a wagering game on the EGM, wherein the wagering game operates according to a set of game rules including game flow rules that define a sequence of game events that are presented to a player in a course of operation of the wagering game, a math engine that governs probabilities of pseudorandom events that can occur in the course of operation of the wagering game, and a pay table that defines winning events that can occur in the course of operation of the wagering game and corresponding payouts that are made to the player upon occurrence of the wining events, wherein the pay table, the math engine and the game flow rules provide payouts having a return to player (RTP), over time, that falls within a predetermined window, cause the processor circuit to determine a player game play preference of the player associated with playing the wagering game on the EGM, cause the processor circuit to adjust the game flow rules from a first set of game flow rules to a second set of game flow rules in response to the determined player game play preference, and cause the processor circuit to present the wagering game to the player using the second set of game flow rules while maintaining the RTP within the predetermined window.

A method according to some embodiments includes initiating a wagering game on an electronic gaming machine, wherein the wagering game operates according to a set of game rules including game flow rules that define a sequence of game events that are presented to a player in a course of operation of the wagering game, a math engine that governs probabilities of pseudorandom events that can occur in the course of operation of the wagering game, and a pay table that defines winning events that can occur in the course of operation of the wagering game and corresponding payouts that are made to the player upon occurrence of the wining events, wherein the pay table, the math engine and the game flow rules provide payouts having a return to player, over time, that falls within a predetermined window, determining a player game play preference of the player associated with playing the wagering game on the EGM, adjusting the game flow rules from a first set of game flow rules to a second set of game flow rules in response to the determined player game play preference, and presenting the wagering game to the player using the second set of game flow rules while maintaining the RTP within the predetermined window.

An EGM according to some embodiments includes a processor circuit and a memory coupled to the processor circuit. The memory includes machine-readable instructions that, when executed by the processor circuit cause the processor circuit to initiate a game on the EGM, wherein the game operates according to a set of game rules including comprising game flow rules that define a sequence of game events that are presented to a player in a course of operation of the game, a math engine that governs probabilities of pseudorandom events that can occur in the course of operation of the game, and a win table that defines winning events that can occur in the course of operation of the game and corresponding rewards that are made to the player upon occurrence of the winning events. The processor circuit determines a player game play preference of the player associated with playing the game on the EGM, adjusts the game flow rules from a first set of game flow rules to a second set of game flow rules in response to the determined player game play preference, adjusts the math engine to compensate for changes in the game flow rules, and presents the game to the player using the second set of game flow rules.

BRIEF DESCRIPTION OF THE SEVERAL VIEWS OF THE DRAWINGS

Certain embodiments of the inventive concepts are illustrated in the Figures of the accompanying drawings in which.

DETAILED DESCRIPTION

Figure 1:
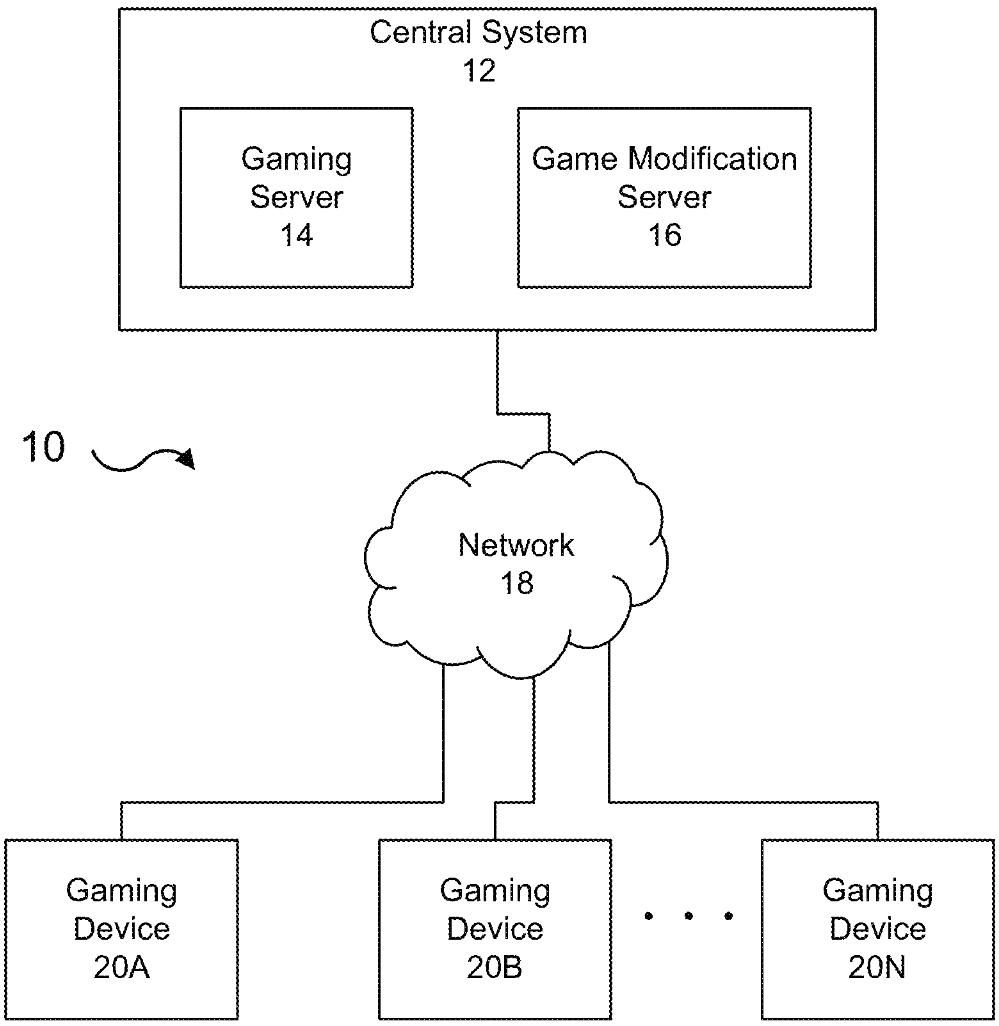
FIG. 1 is a block diagram depicting a wagering game network according to one embodiment of the inventive concepts.

For simplicity and illustrative purposes, the principles of the present inventive concepts are described by referring mainly to various exemplary embodiments thereof. Although the preferred embodiments of the inventive concepts are particularly disclosed herein, one of ordinary skill in the art will readily recognize that the same principles are equally applicable to, and can be implemented in other systems, and that any such variation would be within such modifications that do not part from the true spirit and scope of the present inventive concepts. Before explaining the disclosed embodiments of the present inventive concepts in detail, it is to be understood that the inventive concepts are not limited in its application to the details of any particular arrangement shown, since the inventive concepts is capable of other embodiments. Throughout this description, certain acronyms and shorthand notations are used. These acronyms and shorthand notations are intended to assist in communicating the ideas expressed herein and are not intended to limit the scope of the present inventive concepts. Other terminology used herein is for the purpose of description and not of limitation.

Methods and systems for providing automated discovery of gaming preferences are provided. The gaming preferences can then be used to customize the game play of a game by adjusting the game flow rules of the game. In contrast to systems in which gaming preferences, demographic information, historical game play or other factors are used as a basis to recommend a new game to a player, some embodiments disclosed herein enable a game system to customize the game experience of a game to the player without requiring the player to switch to playing a different game. Moreover, some embodiments customize the game experience of the player while maintaining game functionality, and in particular return to player, or RTP, of the game within regulatory or policy requirements.

Because game preferences that are used to customize the game player may be automatically discovered during or in association with game play, the system may operate anonymously, for instance, where the game player is unidentified or unrecognized by the gaming system. Alternatively, the game player may be identified to the gaming system, for instance through a game player account, a responsible gaming account, a social network account, or other suitable indicia of identification. In one embodiment, player game session data may be used to build a gaming and play behavior model that represents different aspects such as play, game and wagering behavior. As used herein, gaming and play behavior is represented data related to any one or more of a plurality of different game features. Game features may include, for instance: game session length; wager denominations, play rates (number of games played per time segment), typical bonus values, and other features as described below. For example, the model could include a cluster of games that are suited to players that like to play games for a shorter time with large amounts of money wagered. Another cluster includes games that are more suitable for players that like to play for longer times with smaller amounts of money. In one embodiment, when a player begins to play a game, data related to the player's game playing behavior is detected and analyzed. Based on the analysis of this data, the player can be classified, in real time, into one of the existing clusters.

Once the player has been classified, one or more aspects of a wagering game can be customized to match the preferences of the player. By matching the preferences of the player, the player may be encouraged to play a game longer, which may increase the utilization of a gaming machine. A gaming machine, like any other item of capital equipment is more effective and efficient the more it is utilized. In addition, there is a better the rate of return on the investment in capital equipment that is better utilized. When game play of an EGM is adjusted to better suit the preferences of a player, the player may be more likely to continue to play that particular EGM, thereby increasing the utilization of the machine.

Components of an exemplary system 10 for dynamic adjustment of game play based on discovered gaming preferences are shown in FIG. 1. These include a central system 12 having a gaming server 14 and a game modification server 16. The central system 12 may be connected by a network 18 to various electronic gaming devices or electronic gaming machines (EGMs) 20A, 20B, . . . 20N. The network 18 may include a packet data communication network such as a WAN or LAN. Game play data may be collected from the gaming devices 20A, 20B, . . . 20N and sent through the network 18 infrastructure back to the central system 12. The gaming devices may be wired or wireless mobile gaming devices in any type of gaming setting, for instance dedicated electronic gaming machines as are commonly found in casinos and other venues.

Figure 2:
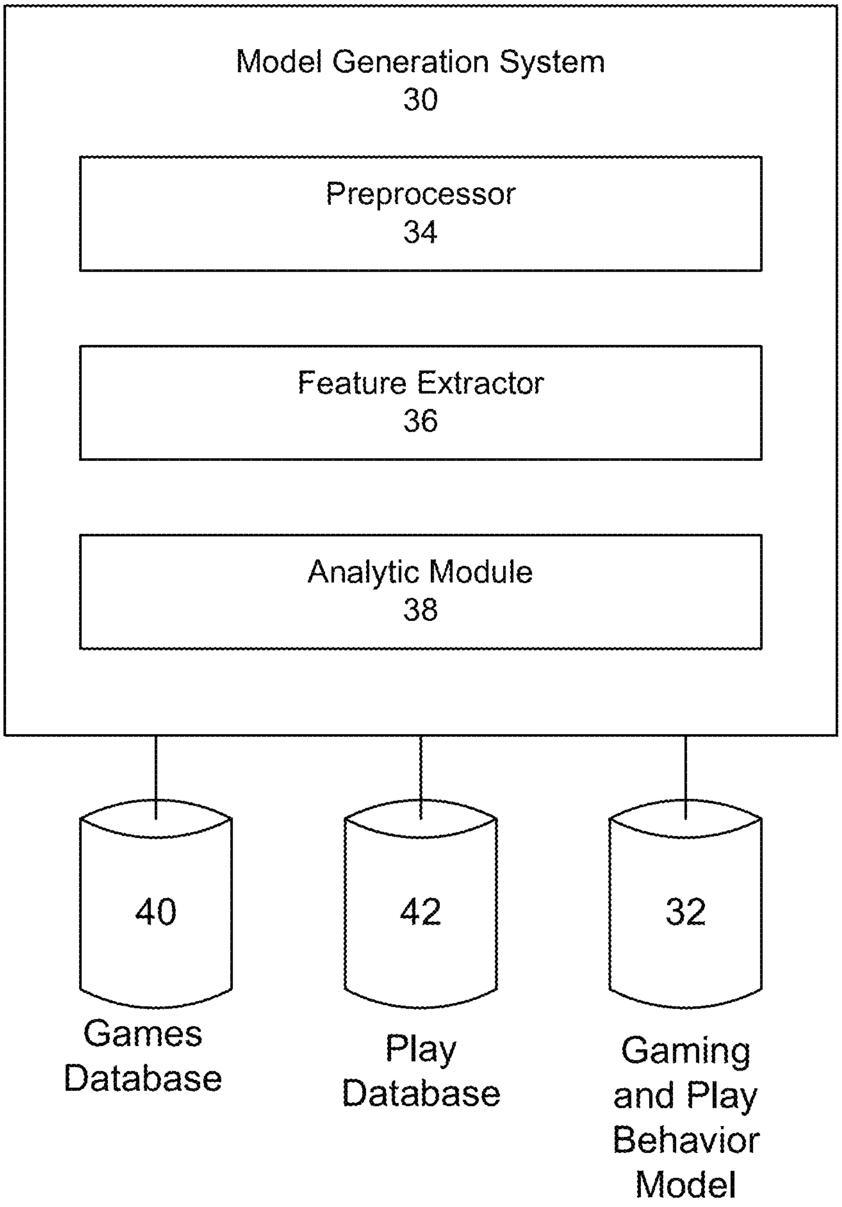
FIG. 2 is a block diagram depicting components of a system that generates the gaming and play behavior model according to certain embodiments of the inventive concepts.

FIG. 2 shows the main components of a model generation system 30 that generates a gaming and play behavior model 32, including a preprocessor 34, a feature extractor 36, and an analytic module 38. In certain embodiments the analytic module 38 is configured to perform a clustering function, as described below. The system 30 of FIG. 2 may be provided with access to a games database 40 and a play data database 42. The play data database 42, may include two sub components: (a) raw historical transaction records collected from gaming devices during past sessions and (b) a cluster model of the raw player data. In one embodiment, the data for the historical transaction records may be stored in the form of journal files and includes historical raw play data. In particular, the raw historical transaction records may include data related to player wagering and other real-time game play characteristics including game selection; amounts of incremental wagers; wagering frequency; elapsed time; reaction to bonus rounds; reaction to progressive output as well as others. The games database 40 includes information on game titles available to players along with game data and features such as themes, denominations, characteristics, etc. Game characteristics that may be stored in the games database 40 may include features derived from game speed; wager amounts; wager rate; presence and frequency of bonus rounds; presence and frequency of progressive outputs; odds of winning; prize distributions, and others.

Figure 3:
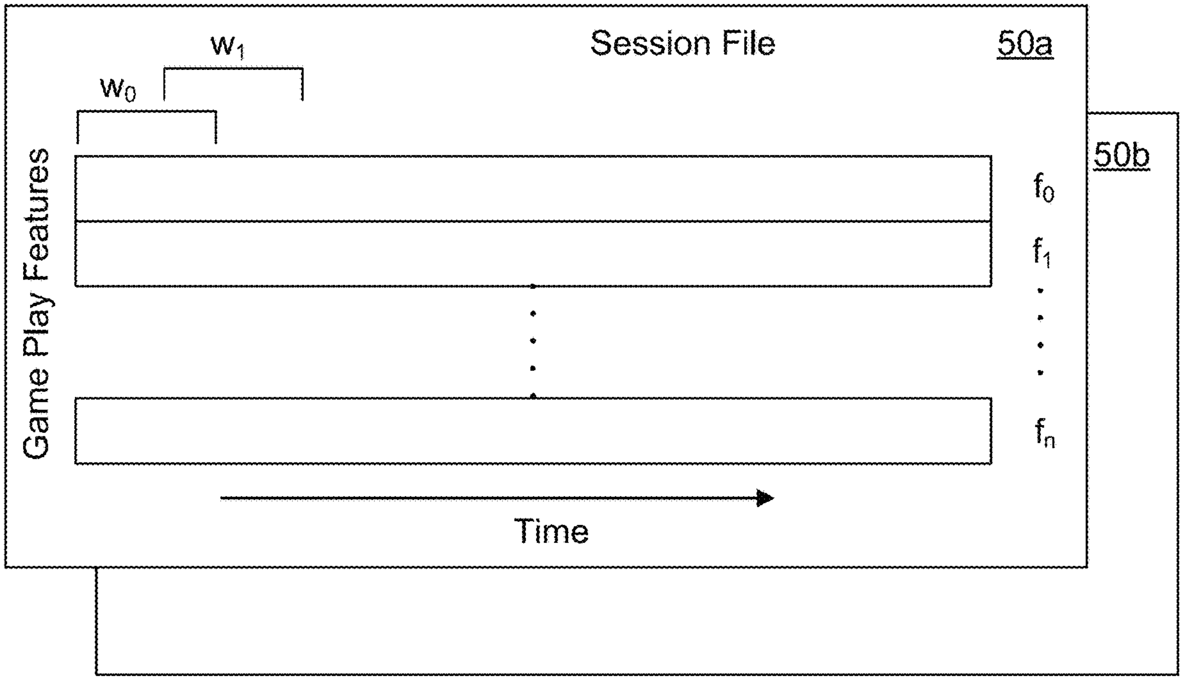
FIG. 3 illustrates a representation of play data in accordance with an embodiment of the inventive concepts.

In some embodiments, the system 30 performs a training process to generate the gaming and play behavior model 32 using a play data database 42. This training may use a temporal representation of the raw historical transaction records within the play data database 42. One embodiment of a temporal representation of the raw play data is depicted in FIG. 3. In this exemplary process, the raw data within the historical transaction records is pre-processed and partitioned into different sessions 50A, 50B. In this embodiment, each session represents a continuous game play, meaning a series of games that were played in a generally uninterrupted fashion. Alternately, each session might represent a particular time period of game play, for instance 15 minutes, 30 minutes, an hour, or another suitable time period. In another alternative, each session may represent a particular number of rounds of a game, for instance 5, 10, 20 or another suitable number of rounds of a game.

As shown in FIG. 3, the play data may be represented using a window style or other graphical approach which includes a variety of different "game features" (FIG. 3, y-axis, $f_0 \ldots f_n$). In one embodiment, data for 28 different game features is tracked for each session. Exemplary game features include: game session length, play behavior, game behavior, game selection, elapsed time with one game, wagering behavior, game type, game theme, wager amounts, wager denominations, play rates, typical bonus values, game brand, prize distributions, amounts of incremental wagers, frequency of wagering, for instance the presence or absence of multiple rounds of wagering in a game, the number of rounds of wagers permitted in a game, maximum wager amounts permitted, minimum wager amounts permitted, amount of wagering, elapsed time between selected events for instance starting a new game, reaction to bonus rounds, reaction to progressive outputs, pay table features, amount of incremental wagers, frequency of wagering, elapsed time for player reaction, amount of wagering, elapsed time between wagers, frequency of player action, game rules, game complexity, ability for a player to control or have an effect on a game outcome, whether an outcome is predetermined, whether parallel wagering is provided, average game speed, average wager amounts, average wager rate, presence or frequency of bonus rounds, presence and frequency of progressive outputs, payout percentages, win rates, win percentages, loss rates, loss percentages, use of special features, frequency of use of special features, number of lines played, total amount wagered, and type of payment received.

As shown in FIG. 3, the horizontal direction represents time in the game session. The game features may be organized into time windows w0, w1 showing the occurrence of the features over time. Collectively the representation of the data as shown in FIG. 3 allows for analysis and detection of "play patterns" through the data and through the various sessions. The size of the window is adjustable and defines a minimum number of incidents necessary to categorize behavior. For instance, in one embodiment, the window size may be set to, for instance, 12 play actions, so that whenever there are 12 play actions in a session the feature may be used as part of the characterization of the game play behavior. This representation has several advantages:

1) Captures behavior as temporal patterns of the play features;
2) Variations in session length are not a factor (so long as sessions meet the minimum length);
3) Game titles can be introduced to map player behavior into game preferences.

Referring back to FIG. 2, the analytic module 38 is a software application or program used to perform a statistical data analysis. In one embodiment, the analytic module 38 is configured to perform a cluster analysis, for instance to group play data into different clusters. Additionally, the analytic module 38 may be configured to analyze the play data and identify the different clusters based on this analysis, before grouping the data into the different clusters. Any suitable clustering algorithm may be used for performing the statistical data analysis and grouping the data into appropriate clusters to form a cluster model. Preferably, a scalable clustering approach that allows for a selection of the number of clusters and support for automatic feature selection is used. In one embodiment, a cluster model is developed automatically using clustering techniques operative for handling and working with large datasets. Preferably the data analysis techniques support streaming (i.e., where the cluster model is updated as new data supports development or modification to the clusters, for instance based on drift in the underlying game play data and behavioral concepts). As used herein, the cluster model includes the identification of different clusters as well as the features relied on to distinguish these clusters.

In one embodiment a two stage hierarchical training process is employed. The analytic module 38 generates a gaming and behavior model. The model includes a number of clusters where each cluster represents a set of game features. Suitable game features are described throughout this disclosure. Groups of clusters may be assembled and assigned to particular gaming trends or behaviors. For instance, a group of clusters may be assembled to identify game players that prefer short games with relatively low wagers. Another group may be assembled for game players that prefer games with multiple rounds of betting or larger wager amounts.

As an alternative to or in addition to clustering, the statistical analysis may employ other data analytic techniques such as factor or regression analysis, hierarchical clustering or DBSCAN analysis.

Figure 4:
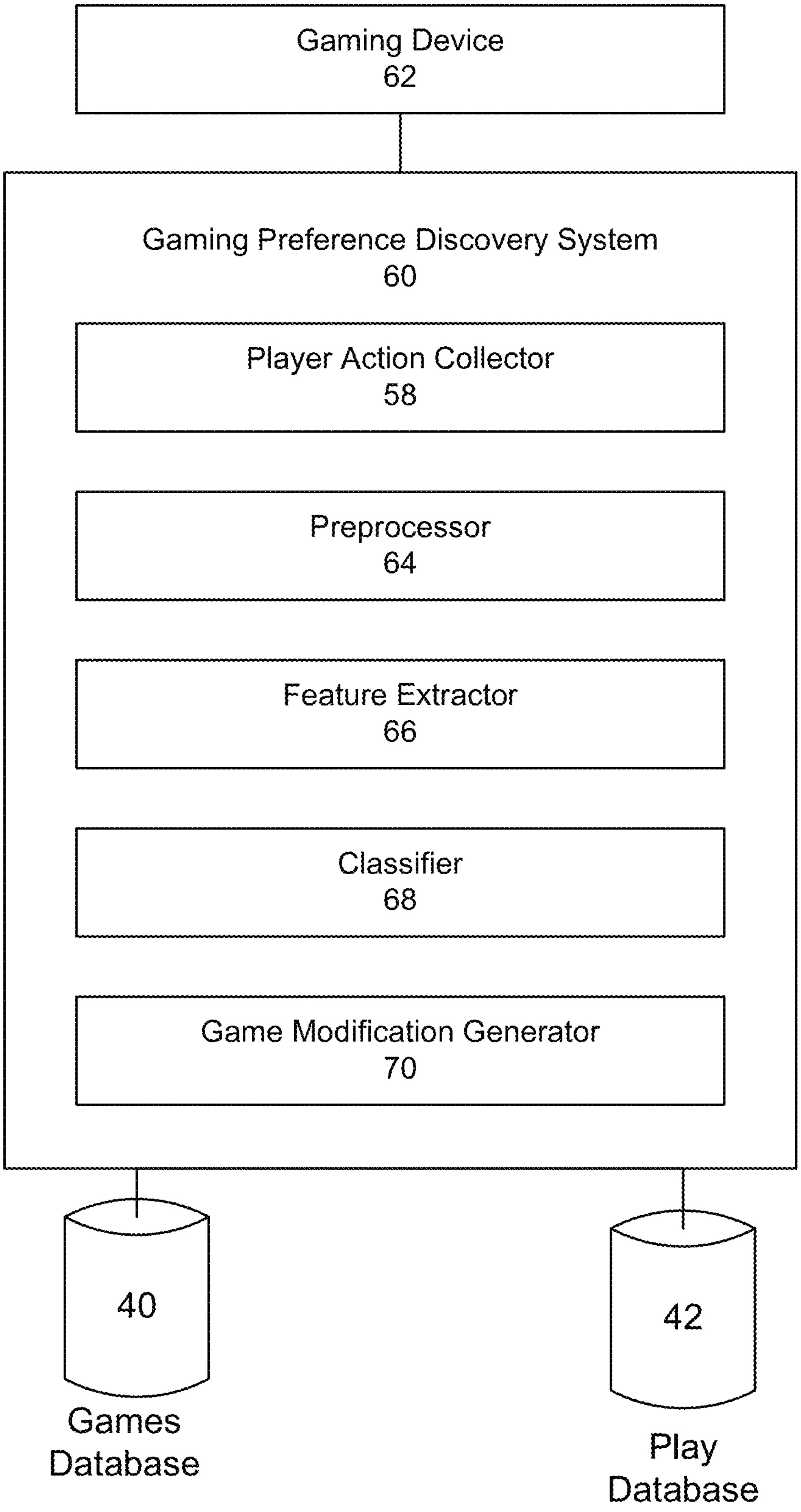
FIG. 4 is a block diagram depicting components of an exemplary system for automatic discovery of gaming preferences in accordance with an embodiment of the inventive concepts.

FIG. 4 depicts components of an exemplary gaming preference discovery system 60 for automatic discovery of gaming preferences. The system 60 communicates with a gaming device 62 which reports game events to the system 60. The system 60 monitors game events and collects data related to a player's game play from the game events. The gaming preference discovery system 60 includes a player action collector 58 that collects data related to actions taken by a player during game play. This data may include various game features, suitable game features are described throughout this disclosure.

In some embodiments, the player action collector 58 collects player data from the moment a player inserts a player card or begins a wagering game, for instance by inserting a wager, or pressing a start button or otherwise providing an indication of a player's desire to play a wagering game. In certain embodiments, the player data comes directly from the gaming device 62. The system may be configured to collect data for a predetermined or preset length of time, which time period may be adjustable by the game operator. Software in the system may be configured to perform a preprocessing step, involving cleaning the data collected by the player actions collector 58 with a preprocessor 64. Cleaning the data may involve any one or more of the following subtasks: noise reduction or removal, identification and removal of outlying data entries, and resolving inconsistencies in the data. Cleaning may also refer to taking data in a raw or uncleaned state or form and converting the data into a form that is better suited for a mining or modeling task. For instance, cleaning may include processing or removal of extraneous or unnecessary data such as meta data, tags, or empty fields. Software in the system may also be configured to filter the data from the player actions collector 58 with a features extractor 66. In this context, filtering refers to a specific approach to feature extraction where redundancies (i.e., attributes carrying less information) are eliminated by a function or ranking process. Other techniques for data manipulation may also be used or they may be used in the alternative, for instance wrapper, embedded and search based models of data management and manipulation. The preprocessing step and feature extracting steps may be performed separately, in sequence or in parallel, or they may be performed together. Similarly, the software module or engine(s) that perform these steps may be provided separately or together.

In some embodiments, in a pre-defined time period, for instance a time period beginning from the start of game play, the system for automatic discovery of gaming preferences 60 begins to attempt to match the player's session gaming behavior with one or more specific clusters of game content that have previously been identified by the data mining steps, described herein (those steps involved in cluster model generation or other suitable analysis). The result of this matching are used to determine which of the one or more previously identified clusters of game content are most closely matched with the player and game wagering behavior. In one embodiment, each previously identified cluster of game content is matched to at least one unique game player type. In this way, the player may be assigned one of several game player types. The matching and determination of a game player type may be determined by a classifier 68 in a classifying or determining step where the game player is classified into a game player type.

In other embodiments, a player may provide and the system may receive a selection of a game to play from the game player. This selection may be used in the determination of the at least one game player type.

After or responsive to the determination of a game player type, a game modification generator 70 may generate one or more suggested game play modifications that may be implemented by the gaming device to match the determined game player type of the player. In some embodiments the gaming device may provide a list of modifiable parameters to the game modification generator 70, and the game modification generator may provide a suggested modification to the modifiable parameters based on the determined game player type. Modification of game play based on game player type will be described in more detail below. In some embodiments the game modification generator 70 is omitted from the gaming preference discovery system 60 and is instead implemented within the gaming device 62. That is, in some embodiments, the gaming preference discovery system 60 only determines the game player type of the player and reports the game player type to the gaming device 62, which modifies a game on the gaming device 62 based on the determined game player type of the player. In other embodiments, the gaming preference discovery system 60 may be integrated within a gaming device 62.

In some embodiments, a player, either unregistered or registered, may be prompted, at least once, by an electronic gaming machine, to agree to the system monitoring his or her game playing. Alternatively, or additionally, the player may be prompted to agree to the system collecting game play data related to the activity of the player. Accordingly, the methods may include the steps of: receiving an indication of agreement to monitoring of game play from the game player, and/or receiving an indication of agreement to collection of game play data from the game player. According to subsequent live game playing data collection and analysis, the player may then be presented with a set of games selected to match the player's gaming preferences. Further, the system may update or change the player's game player type based on live or near live game playing data or metrics. In some embodiments, the system may update the player's game player type after a predetermined number of games are played or after a predetermined length of time. The predetermined number of games or predetermined length of time may be set by a game operator. The unregistered player may be prompted again to agree to the system monitoring his or her game playing at another electronic gaming machine within the same establishment (for instance a casino or a video lottery terminal system with geographical limits, or within geographical limits, for instance, by an online gaming system).

In other embodiments, a registered player having an account or other method by which the player might be identifiable to a gaming system is logged into the system, for instance with an electronic gaming machine, or online, and is prompted for approval at least once, at the electronic gaming machine or online, to agree to the system monitoring his or her game playing. For instance, the system may have previously assigned the player a game player type based on historical game play data. Further, the system may update or change the player's game player type based on live or near live game playing data or metrics. In one embodiment, the system may update the player's game player type after a predetermined number of games are played or after a predetermined length of time. The predetermined number of games or predetermined length of time may be set by a game operator, for instance a casino of electronic gaming machine operator or by the game player.

In some embodiments, a registered player has a responsible gaming account or profile. In such an embodiment, the system is configured to consider data or other information from the responsible gaming account in determining the profile for the player or in adjusting a game selection previously offered to a player or previously determined without consideration of the existence of a responsible gaming account or data associated with that account. In adjusting a game selection, the system may take a selection of games based on a determined player profile and then add or remove games, the addition or subtraction of games being based on the data associated with or the presence of the player registration or the responsible gaming account.

For a non-registered player, or a player that is unidentified to the gaming system, if the player profile resulting from a live session based analysis falls within a particular risk category, or otherwise identifies certain risk factors, then the system, may limit the adjustment of game play to adjustments appropriate to registered players also having that risk category.

Figure 5:
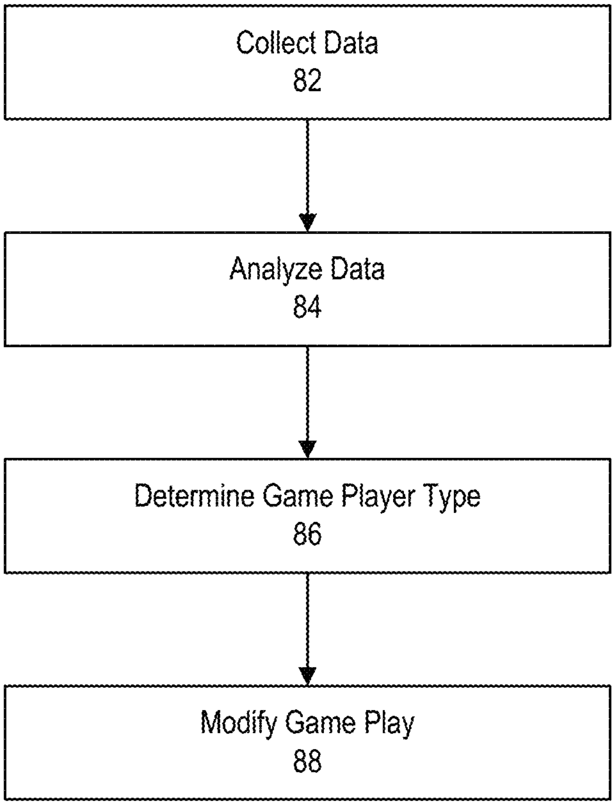
FIG. 5 is a flowchart illustrating a method of determining and providing a selection of games for a player.

FIG. 5 illustrates a method that may either be performed as a separate embodiment of the inventive concepts of this disclosure or as a continuation of the steps described below to create a game player type from a collection of data related to game play. The method illustrated in FIG. 5 may be used to discover the gaming preferences of a game player and to modify a wagering game on an EGM to match those gaming preferences. The method includes collecting at or near real-time data 82 representative of ongoing game play, analyzing this data 84, optionally determining a game player type 86 and then modifying game play of a game 88, where the modification is based on preferences detected from the player's unique behaviors or preferences detected from the data representative of ongoing game play.

Additionally, the gaming preferences of a player and even game player type may be derived or obtained from a player's social networking accounts. In this instance, the system would customarily request permission to access the player's social networking account. This embodiment where social networking information or data is factored in to the adjustment of games or the determination of the game player type may be used only with registered players, or it may also be used with players that are unregistered or unidentified or even those that do not have a player account. In such instance, the wagering game system may be hold or have no access to information or any player account identifying the player to the wagering game system. The persona may be derived through proprietary software or third party available software. The persona may be used in part to recommend games to registered players or even to players which have patterns similar to registered players.

The method includes collecting a set of data related to game factors for game play in an ongoing game by a current game player 82. This collection of data is performed during a game player's actual game play, in real time or near real time. These game factors may be the same as or a larger set or subset of the game factors described above with respect to analyzing the larger data set used to generate game player types. A separate software module may be provided to handle collection of the data and this module may be provided in any suitable location or device, for instance, a gaming device, a controller in a gaming venue, a local system in the gaming venue, a system in a data center, a system in a social media network or in a private cloud, public cloud, hybrid cloud or community cloud.

The method also includes analyzing the collected set of data 84. Certain game factors, or indicators, may be weighted or the dimensions of measurement adjusted so that they are more important or less important than other factors in the overall analysis of the data. In one embodiment, the data analysis is performed using a cluster analysis of the collected set of data. Additionally, or alternatively, the analysis may simply involve identification of particular game factors, the frequency of these game factors, any trends in the appearance of the game factors (for instance, whether particular actors tend to appear closer together in time), or a combination of these different indicators.

The method may also include determining at least one game player type 86 for the current game player based on the analysis of the collected set of data. The game player types described herein are exemplary in nature, and it will be understood that many different game player types may be identified instead of or in addition to those described herein may be identified. In some embodiments, a player may be classified based on his or her game play as belonging to a category that describes how a player likes to play or what kinds of game play experiences the player enjoys. The categories may include ones such as "play with money", "reach bonus games", "maximize time on machine", "take risks", "play the same game", and "achieve certain goals." These categories are described briefly below.

Play With Money

If the identified player behavior category is "play with money," the player is assumed to be seeking entertainment and may prefer to play fun skill-based bonus rounds. A "play with money" player wants entertainment only, and is not seeking to maximize return. The player just wants to take risks with money, may like skill based games more than gambling games.

Reach Bonus Games

If the identified player behavior category is "reach bonus games," the player is assumed to want to play games and reach the bonus games.

Maximize Time on Machine

If the identified player behavior category is "maximize time on machine," the player is assumed to want to spend as much time as possible on the gaming machine for a given wagering level.

Take Risks

If the identified player behavior category, is "take risks," the player is assumed to favor games that have a high wager denomination and/or high levels of risk versus return, i.e., high volatility.

Play the Same Game

If the identified player behavior category is "play the same game," the player is assumed to want to stay on the same machine for the duration of his or her gaming session.

Achieve Certain Goals

If the identified player behavior category is to achieve certain goals, the player is assumed to want to achieve goals during game play.

Determination of gaming behavior category may be assisted by means of in-game surveys. For example, the gaming preference discovery system 60 could cause the gaming device to prompt the player with a question that is designed to have the player choose between two different behavior categories. For example, the gaming device could ask the player after a game in which a reward was earned if he or she would like to play a bonus game, get a free spin or receive money. The answer selected by the player may be used by the classifier to determine the behavior category of the player.

The system may then modify a game for the game player type determined by the analysis of the collected set of data. For example, if the identified player behavior category is "play with money," the game may be adjusted to offer skill based features.

If the identified player behavior category is "reach bonus games," the game flow may be adapted to offer more bonus game opportunities.

If the identified player behavior category is "maximize time on machine," the game flow may be adjusted such that it allows the player to play at the lowest possible denomination and/or increases the number of available free spins.

If the identified player behavior category is "take risks," the game flow can be changed to the maximum allowable denomination and/or to be more aggressive and/or have high volatility.

If the identified player behavior category is "play the same game," the game flow can be changed to have high volatility and minimize the number of bonus rounds and minimize the number of free spins.

If the identified player behavior category is "achieve certain goals," the game flow can be changed to provide additional in-game goals for the player to achieve, such as collecting items or reaching levels upon attainment of goals.

If a player is determined to have more than one significant area of interest, the game flow may be changed to have a combination of changes. For example, if a player has interests to play with money and reach the bonus games, the game flow may be changed to allow the player to play more fun skill-based bonus games.

Figure 6:
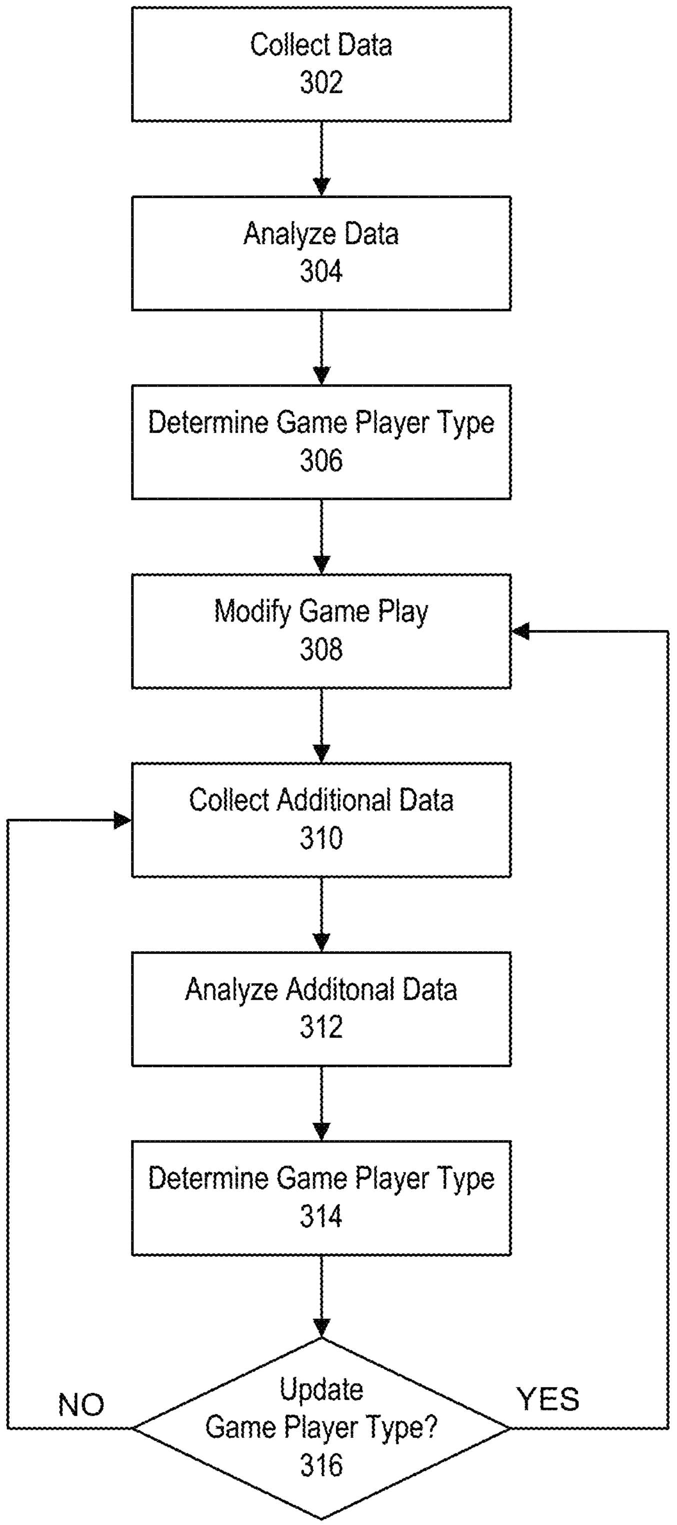
FIG. 6 is a flowchart illustrating another method of determining and providing a section of games for a player.

FIG. 6 shows another embodiment of a method 300 to discover the gaming preferences of a game player and to modify game play of a game to match those gaming preferences. The method of FIG. 6 includes collecting data 302 representative of ongoing game play, analyzing this data 304, determining a game player type 306 and then modifying game play based on game player type 308, similar to the steps described above with reference to FIG. 5. Additionally, the method illustrated in FIG. 6 includes collecting additional data 310 related to game factors for game play in an ongoing game by a current game player. Specifically, the collection of data 302 and analysis of this data 304 may be performed in a manner similar to that described above with reference to FIG. 5. Thus, this collection of data 310 is performed at or near real time during ongoing actual game play by a game player. The additional set of data may be provided in a time period separate from (for instance after) or overlapping the first set of data. The additional second set of data may relate to a longer period of time than the first set of data. Alternatively, the additional set of data may relate to a different set of game factors than the first set of data.

These game factors may be the same as or a larger set or subset of the game factors described above with respect to analyzing the larger data set used to generate game player types and suitable game factors are described throughout this disclosure. Additionally, the second set of data may be larger than the first set of data.

The method may also include analyzing the second set of data 312. Certain game factors may be weighted or the dimensions of measurement adjusted so that they are more important or less important than other factors in the overall analysis of the data. In one embodiment, the data analysis is performed using a cluster analysis of the second set of data. Additionally, or alternatively, the analysis may simply involve identification of particular game factors, the frequency of these game factors, any trends in the appearance of the game factors (for instance, whether particular actors tend to appear closer together in time), or a combination of these different indicators.

The method may also include determining at least one game player type 314 for the current game player based on the analysis of the second set of data. For instance, the analysis may reveal that a player changes his or her game play preferences over time. Thus, in this way, the system may continually monitor, collect data, and update a current game player's previously-determined game player type. In one embodiment, determining the at least one game player type for the current game player includes factoring and/or updating a previously identified game player type.

In one embodiment, determining at least one game player type for the current game player based on the analysis of the second set of data involves determining that at least one updated game player type is different from a previously identified game player type. In this embodiment, the method may further include the step of changing the previously identified game player type for the current game player to the updated game player type.

In another embodiment, a game player type may be updated based on an analysis of an additional set of not just one, but a plurality of game play periods, data sets, factors, or a combination of any of the foregoing.

The system can then optionally make a determination as to whether to update the game player type 316. In certain embodiments, the system default may be set to update the game player type and no separate determination step is necessary. In an instance where the game player type is updated, the method may proceed to adjust game play of a game based on the newly identified, updated, game player type. In an instance where the game player type remains unchanged, the process may continue to collect a new or the same second set of data 310 and then work back through the steps of analyzing the new or updated second set of data 312 and a subsequent determination of the game player type 314. Alternatively, where the game player type remains unchanged, the method may end (not shown).

Figure 7:
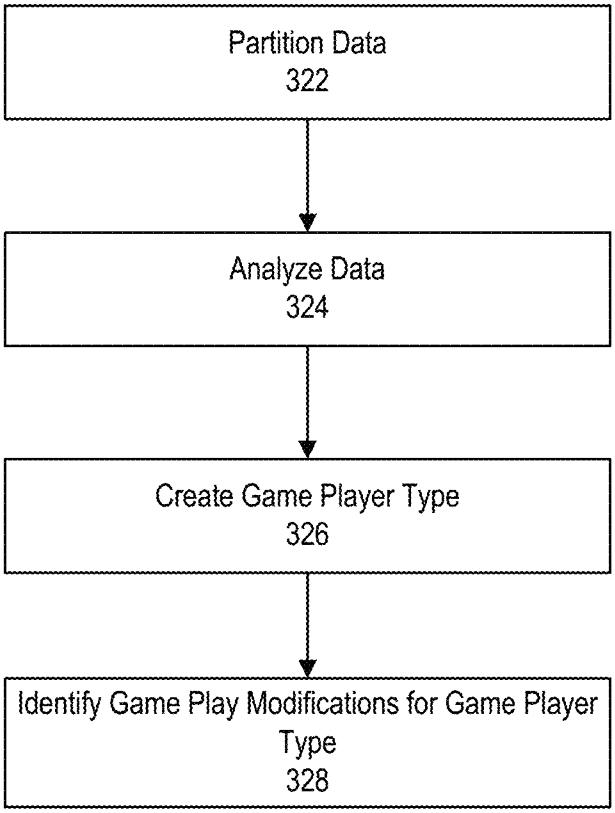
FIG. 7 is a flowchart illustrating a method of creating a game player type and identifying games suitable for the created game player type.

Referring now to FIG. 7, in another embodiment, a computer implemented method 320 is provided for creating a set of game player types for use in operating a wagering game. The method may include a first step (not shown) of collecting a set of data related to one or more game factors or game features, for instance based on actual, simulated or historical game play. In another embodiment of the method, the set of data related to one or more game factors may be previously available so that the step of collecting the data may not be required for the inventive method. Suitable game factors, also referred to herein as game features, are described throughout this disclosure.

An optional step involves partitioning the set of data 322 into one or more game play periods. Each game play period may represent a continuous or relatively continuous period of game play, for instance, a series of consecutive games played by a player in one sitting at an electronic gaming machine. This step may be combined with the step of collecting the data and it may also be combined with the step of analyzing the data 324. In addition, gaming data may be held in a central repository and be partitioned based on geo zones which may reflect local or country based partitioning. The system may offer a mix of selection from within various partitions based upon language; geo zones as well as time sliced processed data.

The data is analyzed 324 to identify instances of the game factors described above, including the frequency of appearance of the game factors, their distribution within the data set, and clusters, trends or other patters are identified. Certain game factors, or indicators, may be weighted or the dimensions of measurement adjusted so that they are more important or less important than other factors in the overall analysis of the data. In one embodiment, the data analysis is performed using a cluster analysis of the set of data within each game play period. Additionally, or alternatively, the analysis may be performed against the set of data without partitioning into game play periods.

The data analysis allows the system to create at least one game player type 326. In one embodiment, the game player type is an association or collection of one or more game factors, such as those described above. This association or collection may represent a particular model of game player. For instance, the data analysis may show that certain players prefer games that are quickly resolved (from start to finish) and have small wager amounts. Data suggesting this trend could be used to create a game player type based on this trend. In one embodiment, the game player type is a collection of data including an identifier that allows the system to identify the collection of data, and, optionally, that the data provides a game player type. The game player type may also include data which indicates the game factors defining the particular features of the games to be affiliated with the game player type. These features may be identified in the affirmative, for instance as features that should or are preferably present in the games to be affiliated with the game player type. Alternatively, or additionally, some features may be identified in the negative, for instance features that should not be or are preferably not present in the games to be affiliated with the game player type.

Figure 8:
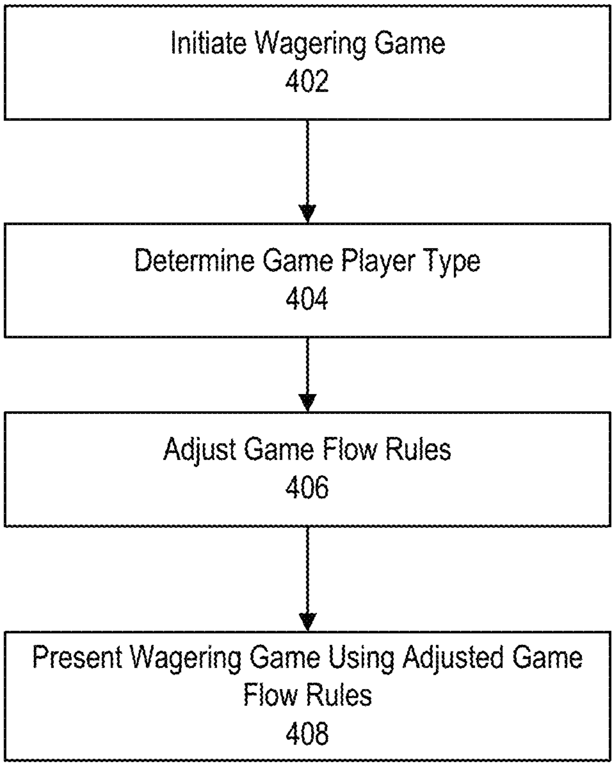
FIGS. 8, 9 and 10 are flowcharts illustrating dynamic game flow modification according to some embodiments.

Referring to FIG. 8, a method according to some embodiments includes initiating a wagering game on an electronic gaming machine (402), wherein the wagering game operates according to a set of game rules including game flow rules that define a sequence of game events that are presented to a player in a course of operation of the wagering game, a math engine that governs probabilities of pseudorandom events that can occur in the course of operation of the wagering game, and a pay table (or win table) that defines winning events that can occur in the course of operation of the wagering game and corresponding payouts that are made to the player upon occurrence of the winning events. In a wagering game, the pay table, the math engine and the game flow rules provide payouts having a return to player (RTP), over time, that falls within a predetermined window. The method includes determining a player game play preference of the player associated with playing the wagering game on the EGM (404), adjusting the game flow rules from a first set of game flow rules to a second set of game flow rules in response to the determined player game play preference (406), and presenting the wagering game to the player using the second set of game flow rules while maintaining the RTP within the predetermined window (408).

In a wagering game, a pay table specifies the list of payouts on a game. The pay table shows how much the player will win for each combination of symbols and wager. For a non-wagering game, a win table specifies what non-monetary prizes a player can win in the event of a winning event, such as extra lives, bonus items, extra play time, etc. For convenience, embodiments are described herein with respect to pay tables. However, the description of such embodiments may applied with appropriate modifications to non-wagering games including win tables.

The pay table of a game in general can be classified by its volatility level. The volatility level refers to the amount of risk characteristic of a game and is used to describe how often and how much a player expects to win during his/her playing session. In a low volatility game, the player wins frequently, but usually the total payouts will be small. On the other hand, in a high volatility game the player would see occasional big wins over a prolonged period of no wins. The pay tables can be designed to match the player type, such that they cover a range of variations between low volatility and high volatility. The volatility of a game can be changed in a variety of manners, such as by increasing the payout associated with one or more winning outcomes in the pay table, increasing the probability of occurrence of one or more winning outcomes in the pay table, adding new winning outcomes to the pay table, or using a different pay table having one of these features. High volatility games equate to high risk, because payouts are fewer and farther between, while low volatility games are considered low risk, because wins are smaller but more frequent.

Figure 9:
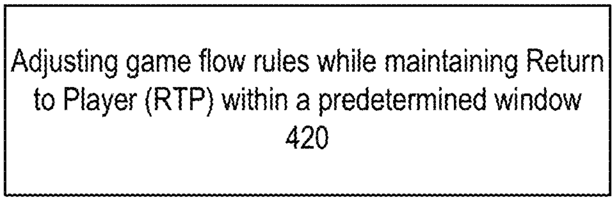

Referring to FIG. 9, the method may further include maintaining the RTP within the predetermined window by adjusting the math engine to compensate for changes in the game flow rules (420).

Figure 10:
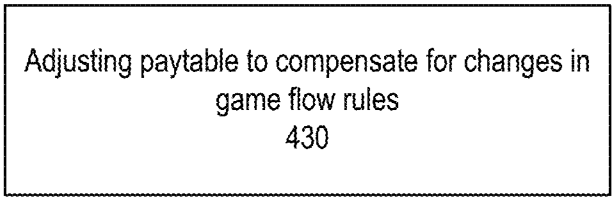

Referring to FIG. 10, the method may further include maintaining the RTP within the predetermined window by adjusting the pay table to compensate for changes in the game flow rules (430).

The player game play preference includes a preference selected from the group of a preference for playing bonus games, a preference for maximizing playing time, a preference for achieving in-game goals, and a preference for playing the same game.

The first set of data represents a game factor selected from a group consisting of game session length, play behavior, game behavior, game language, game location, game selection, elapsed time with one game, wagering behavior, game type, game theme, wager amounts, wager denominations, play rates, typical bonus values, game brand, prize distributions, amounts of incremental wagers, frequency of wagering, for instance the presence or absence of multiple rounds of wagering in a game, a number of rounds of wagers permitted in a game, maximum wager amounts permitted, minimum wager amounts permitted, amount of wagering, elapsed time between selected events for instance starting a new game, reaction to bonus rounds, reaction to progressive outputs, pay table features, amount of incremental wagers, frequency of wagering, elapsed time for player reaction, amount of wagering, elapsed time between wagers, frequency of player action, game rules, game complexity, ability for a player to control or have an effect on a game outcome, whether an outcome is predetermined, whether parallel wagering is provided, average game speed, average wager amounts, average wager rate, presence or frequency of bonus rounds, presence and frequency of progressive outputs, payout percentages, win rates, win percentages, loss rates, loss percentages, use of special features, frequency of use of special features, number of lines played, total amount wagered, and type of payment received.

The method may further include collecting a first set of player game play preference data related to an ongoing game by the player, and analyzing the first set of data to determine the game play preference of the player based on analysis of the first set of data.

The method may further include receiving the player game play preference from a remote server, and updating the player game play preference based on an additional set of data for an additional period of game play on the EGM by the player.

An electronic gaming machine (EGM) includes a processor circuit, and a memory coupled to the processor circuit, the memory including machine-readable instructions that, when executed by the processor circuit cause the processor circuit to initiate a wagering game on the EGM, wherein the wagering game operates according to a set of game rules including game flow rules that define a sequence of game events that are presented to a player in a course of operation of the wagering game, a math engine that governs probabilities of pseudorandom events that can occur in the course of operation of the wagering game, and a pay table that defines winning events that can occur in the course of operation of the wagering game and corresponding payouts that are made to the player upon occurrence of the wining events, wherein the pay table, the math engine and the game flow rules provide payouts having a return to player (RTP), over time, that falls within a predetermined window. The instructions further cause the processor circuit to determine a player game play preference of the player associated with playing the wagering game on the EGM, to adjust the game flow rules from a first set of game flow rules to a second set of game flow rules in response to the determined player game play preference, and to present the wagering game to the player using the second set of game flow rules while maintaining the RTP within the predetermined window.

The memory may further include machine-readable instructions that, when executed by the processor circuit cause the processor circuit to maintain the RTP within the predetermined window by adjusting the math engine to compensate for changes in the game flow rules.

The memory may further include machine-readable instructions that, when executed by the processor circuit, cause the processor circuit to maintain the RTP within the predetermined window by adjusting the pay table to compensate for changes in the game flow rules.

The player game play preference includes a preference for playing bonus games, and wherein the game flow rules are adjusted to present an increased number of bonus games to the player.

The player game play preference includes a preference for maximizing playing time, and wherein the game flow rules are adjusted to cause the game play to last longer.

The player game play preference includes a preference for achieving in-game goals, and wherein the game flow rules are adjusted to provide more in-game goal completion opportunities to the player.

The player game play preference includes a preference for playing the same game, and wherein the game flow rules are adjusted to reduce bonus game opportunities.

The memory may further include machine-readable instructions that, when executed by the processor circuit, cause the processor circuit to collect a first set of player game play preference data related to an ongoing game by the player, and cause the processor circuit to analyze the first set of data to determine the game play preference of the player based on analysis of the first set of data.

The memory further may further include machine-readable instructions that, when executed by the processor circuit, cause the processor circuit to collect player game play preference data from a moment the player begins to play a wagering game or indicates a desire to play a wagering game on the EGM.

The memory may further include machine-readable instructions that, when executed by the processor circuit, cause the processor circuit to collect player game play preference data for a predetermined length of time.

The memory may further include machine-readable instructions that, when executed by the processor circuit, cause the processor to receive the player game play preference from a remote server, and cause the processor circuit to update the player game play preference based on an additional set of data for an additional period of game play on the EGM by the player.

The EGM my further include an acceptor that receives a physical item having a monetary value associated therewith, wherein the processor circuit credits a first monetary amount to a first credit account based on receiving the physical item, an input device that receives a wager by the player for playing a wagering game on the EGM, and a display device that displays a plurality of game elements as part of the wagering game.

Figure 11A:
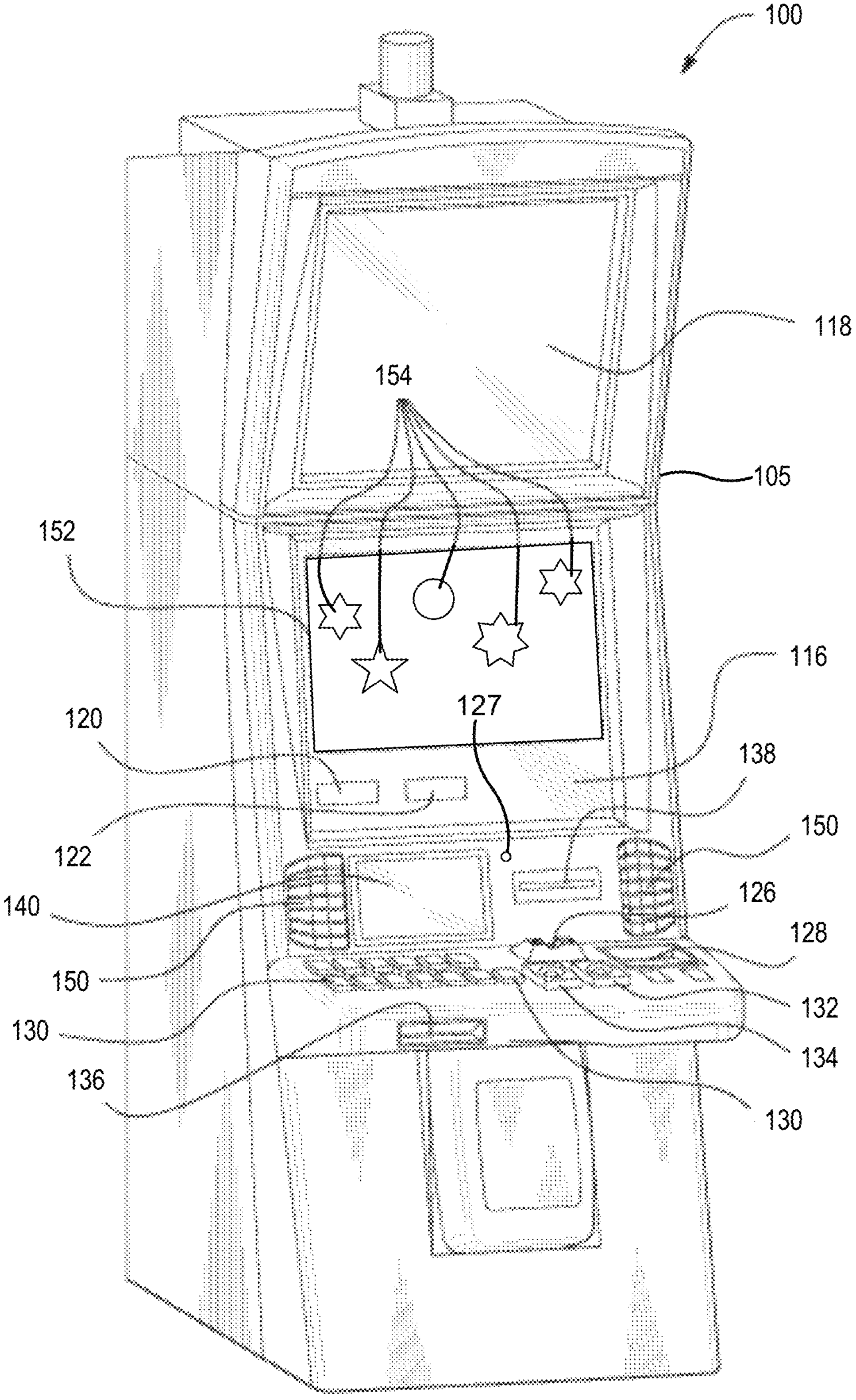
FIGS. 11A to 11E illustrate aspects of electronic game machines according to some embodiments.
Figure 11B:
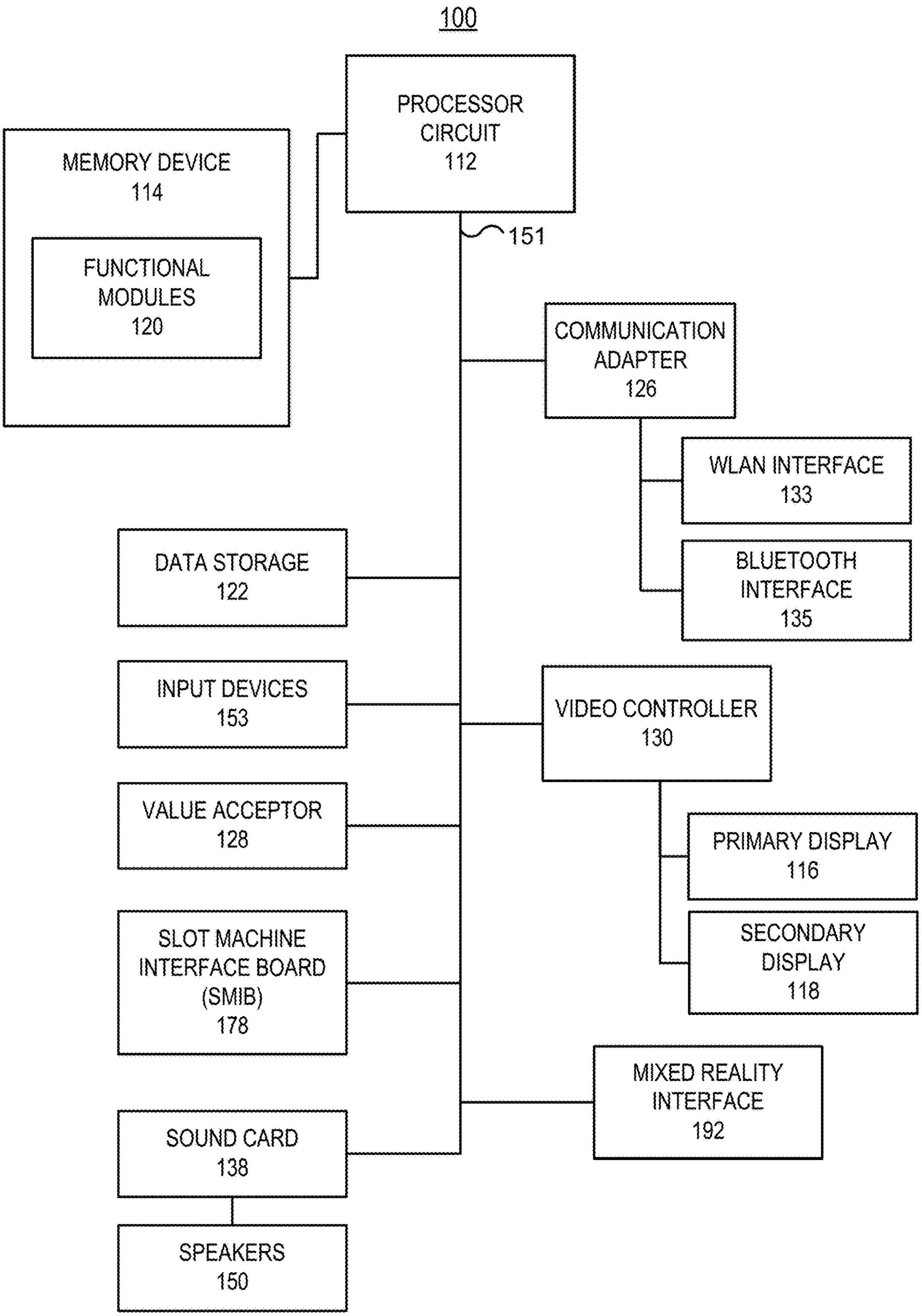
Figure 11C:
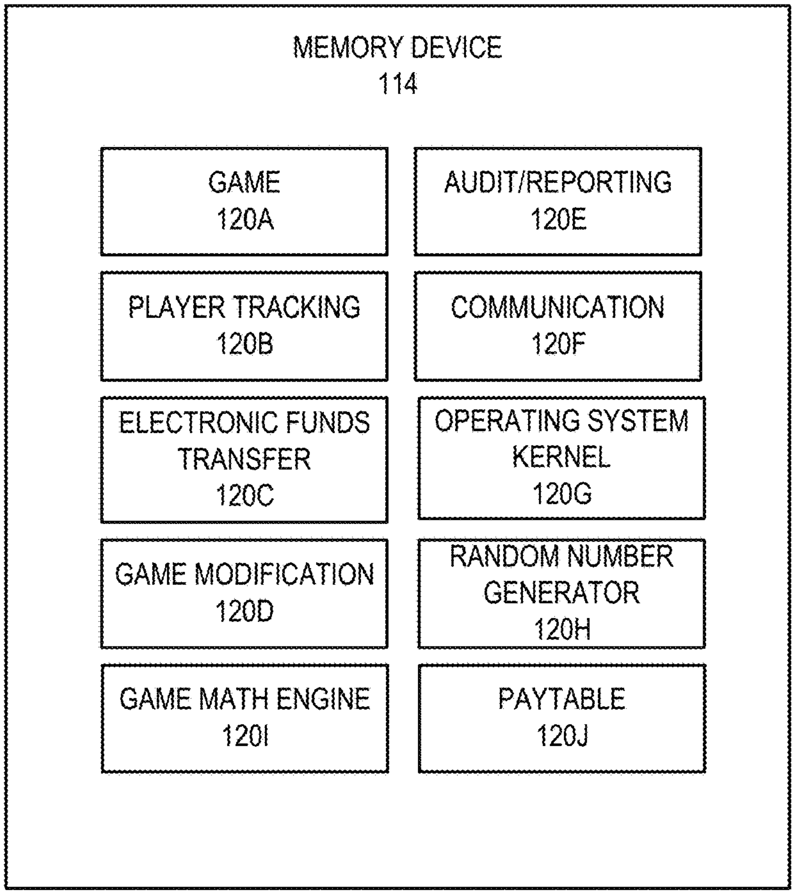

An example of an electronic gaming machine (EGM) that can interact with mixed reality viewers according to various embodiments is illustrated in FIGS. 11A, 11B, and 11C in which FIG. 11A is a perspective view of an EGM 100 illustrating various physical features of the device, FIG. 11B is a functional block diagram that schematically illustrates an electronic relationship of various elements of the EGM 100, and FIG. 11C illustrates various functional modules that can be stored in a memory device of the EGM 100. The embodiments shown in FIGS. 11A to 11C are provided as examples for illustrative purposes only. It will be appreciated that EGMs may come in many different shapes, sizes, layouts, form factors, and configurations, and with varying numbers and types of input and output devices, and that embodiments of the inventive concepts are not limited to the particular EGM structures described herein.

EGMs typically include a number of standard features, many of which are illustrated in FIGS. 11A and 11B. For example, referring to FIG. 11A, an EGM 100 may include a support structure, housing or cabinet 105 which provides support for a plurality of displays, inputs, outputs, controls and other features that enable a player to interact with the EGM 100.

The EGM 100 illustrated in FIG. 11A includes a number of display devices, including a primary display device 116 located in a central portion of the cabinet 105 and a secondary display device 118 located in an upper portion of the cabinet 105. It will be appreciated that one or more of the display devices 116, 118 may be omitted, or that the display devices 116, 118 may be combined into a single display device. The EGM 100 may further include a player tracking display 140, a credit display 120, and a bet display 122. The credit display 120 displays a player's current number of credits, cash, account balance or the equivalent. The bet display 122 displays a player's amount wagered.

The player tracking display 140 may be used to display a service window that allows the player to interact with, for example, their player loyalty account to obtain features, bonuses, comps, etc. In other embodiments, additional display screens may be provided beyond those illustrated in FIG. 11A.

The EGM 100 may further include a number of input devices that allow a player to provide various inputs to the EGM 100, either before, during or after a game has been played. For example, the EGM 100 may include a plurality of input buttons 130 that allow the player to select options before, during or after game play. The EGM may further include a game play initiation button 132 and a cashout button 134. The cashout button 134 is utilized to receive a cash payment or any other suitable form of payment corresponding to a quantity of remaining credits of a credit display.

In some embodiments, one or more input devices of the EGM 100 are one or more game play activation devices that are each used to initiate a play of a game on the EGM 100 or a sequence of events associated with the EGM 100 following appropriate funding of the EGM 100. The example EGM 100 illustrated in FIGS. 11A and 11B includes a game play activation device in the form of a game play initiation button 132. It should be appreciated that, in other embodiments, the EGM 100 begins game play automatically upon appropriate funding rather than upon utilization of the game play activation device.

In some embodiments, one or more input devices of the EGM 100 are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In some embodiments, one or more of the display screens may a touch-sensitive display that includes a digitizer 152 and a touchscreen controller 154 (FIG. 11B). The player may interact with the EGM 100 by touching virtual buttons on one or more of the display devices 116, 118, 140. Accordingly, any of the above described input devices, such as the input buttons 130, the game play initiation button 132 and/or the cashout button 134 may be provided as virtual buttons on one or more of the display devices 116, 118, 140.

Referring briefly to FIG. 11B, operation of the primary display device 116, the secondary display device 118 and the player tracking display 140 may be controlled by a video controller 130 that receives video data from a processor circuit 112 or directly from a memory device 114 and displays the video data on the display screen. The credit display 120 and the bet display 122 are typically implemented as simple LCD or LED displays that display a number of credits available for wagering and a number of credits being wagered on a particular game. Accordingly, the credit display 120 and the bet display 122 may be driven directly by the processor circuit 112. In some embodiments however, the credit display 120 and/or the bet display 122 may be driven by the video controller 30.

Referring again to FIG. 11A, the display devices 116, 118, 140 may include, without limitation: a cathode ray tube, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touch-screen with an associated touch-screen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 130 of the EGM 100 are generally configured to display one or more game and/or non-game images, symbols, and indicia. In certain embodiments, the display devices 116, 118, 140 of the EGM 100 are configured to display any suitable visual representation or exhibition of the movement of objects; dynamic lighting; video images; images of people, characters, places, things, and faces of cards; and the like. In certain embodiments, the display devices 116, 118, 140 of the EGM 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The EGM 100 also includes various features that enable a player to deposit credits in the EGM 100 and withdraw credits from the EGM 100, such as in the form of a payout of winnings, credits, etc. For example, the EGM 100 may include a ticket dispenser 136, a bill/ticket acceptor 128, and a coin acceptor 126 that allows the player to deposit coins into the EGM 100.

While not illustrated in FIG. 11A, the EGM 100 may also include a note dispenser configured to dispense paper currency and/or a coin generator configured to dispense coins or tokens in a coin payout tray.

The EGM 100 may further include one or more speakers 150 controlled by one or more sound cards 138 (FIG. 11B). The EGM 100 illustrated in FIG. 11A includes a pair of speakers 150. In other embodiments, additional speakers, such as surround sound speakers, may be provided within or on the cabinet 105. Moreover, the EGM 100 may include built-in seating with integrated headrest speakers.

In various embodiments, the EGM 100 may generate dynamic sounds coupled with attractive multimedia images displayed on one or more of the display devices 116, 118, 140 to provide an audio-visual representation or to otherwise display full-motion video with sound to attract players to the EGM 100 and/or to engage the player during gameplay. In certain embodiments, the EGM 100 may display a sequence of audio and/or visual attraction messages during idle periods to attract potential players to the EGM 100. The videos may be customized to provide any appropriate information.

The EGM 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processor circuit determines the amount of funds entered and displays the corresponding amount on the credit or other suitable display as described above.

In some embodiments, the EGM 100 may include an electronic payout device or module configured to fund an electronically recordable identification card or smart card or a bank or other account via an electronic funds transfer to or from the EGM 100.

FIG. 11B is a block diagram that illustrates logical and functional relationships between various components of an EGM 100. As shown in FIG. 11B, the EGM 100 may include a processor circuit 112 that controls operations of the EGM 100. Although illustrated as a single processor circuit, multiple special purpose and/or general purpose processor circuits and/or processor circuit cores may be provided in the EGM 100. For example, the EGM 100 may include one or more of a video processor, a signal processor, a sound processor and/or a communication controller that performs one or more control functions within the EGM 100. The processor circuit 112 may be variously referred to as a "controller," "microcontroller," "microprocessor" or simply a "computer." The processor circuit may further include one or more application-specific integrated circuits (ASICs).

Various components of the EGM 100 are illustrated in FIG. 11B as being connected to the processor circuit 112. It will be appreciated that the components may be connected to the processor circuit 112 through a system bus, a communication bus and controller, such as a USB controller and USB bus, a network interface, or any other suitable type of connection.

The EGM 100 further includes a memory device 14 that stores one or more functional modules 120. Various functional modules 120 of the EGM 100 will be described in more detail below in connection with FIG. 11D.

The memory device 14 may store program code and instructions, executable by the processor circuit 112, to control the EGM 100. The memory device 114 may also store other data such as image data, event data, player input data, random or pseudo-random number generators, paytable data or information and applicable game rules that relate to the play of the gaming device. The memory device 114 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The EGM 100 may further include a data storage device 122, such as a hard disk drive or flash memory. The data storage 122 may store program data, player data, audit trail data or any other type of data. The data storage 122 may include a detachable or removable memory device, including, but not limited to, a suitable cartridge, disk, CD ROM, DVD or USB memory device.

The EGM 100 may include a communication adapter 26 including transceiver circuitry that enables the EGM 100 to communicate with remote devices over a wired and/or wireless communication network, such as a local area network (LAN), wide area network (WAN), cellular communication network, or other data communication network. The communication adapter 126 may further include transceiver circuitry for supporting short range wireless communication protocols, such as Bluetooth and/or near field communications (NFC) that enable the EGM 100 to communicate, for example, with a mobile communication device operated by a player.

The EGM 100 may include one or more internal or external communication ports that enable the processor circuit 112 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb drives, ticket readers, touch screens, trackballs, touchpads, wheels, and wireless communication devices. In some embodiments, internal or external peripheral devices may communicate with the processor circuit through a universal serial bus (USB) hub (not shown) connected to the processor circuit 112.

In some embodiments, the EGM 100 may include a sensor, such as a camera in communication with the processor circuit 112 (and possibly controlled by the processor circuit 112) that is selectively positioned to acquire an image of a player actively using the EGM 100 and/or the surrounding area of the EGM 100. In one embodiment, the camera may be configured to selectively acquire still or moving (e.g., video) images and may be configured to acquire the images in either an analog, digital or other suitable format. The display devices 116, 118, 140 may be configured to display the image acquired by the camera as well as display the visible manifestation of the game in split screen or picture-in-picture fashion. For example, the camera may acquire an image of the player and the processor circuit 112 may incorporate that image into the primary and/or secondary game as a game image, symbol or indicia.

Various functional modules of that may be stored in a memory device 114 of an EGM 100 are illustrated in FIG. 11C. Referring to FIG. 11C, the EGM 100 may include in the memory device 114 a game module 120A that includes program instructions and/or data for operating a hybrid wagering game as described herein. The EGM 100 may further include a player tracking module 120B, an electronic funds transfer module 120C, a game modification module 120D, an audit/reporting module 120E, a communication module 120F, an operating system 120G, a random number generator 120H, a game math engine 120I and a paytable 120J. The player tracking module 120B keeps track of the play of a player. The electronic funds transfer module 120C communicates with a back end server or financial institution to transfer funds to and from an account associated with the player. The game modification module 20D adjusts game play based on identified player preferences as described in more detail herein. The communication module 120F enables the EGM 100 to communicate with remote servers and other EGMs using various secure communication interfaces. The operating system kernel 120G controls the overall operation of the EGM 100, including the loading and operation of other modules. The random number generator 120H generates random or pseudorandom numbers for use in the operation of the hybrid games described herein. The game math engine 120I defines probabilities of pseudorandom events that can occur in the course of operation of the wagering game based on pseudorandom numbers generated by the random number generator 120H. The paytable 120J defines winning events that can occur in the course of operation of the wagering game.

In some embodiments, an EGM 100 may be implemented by a desktop computer, a laptop personal computer, a personal digital assistant (PDA), portable computing device, or other computerized platform. In some embodiments, the EGM 100 may be operable over a wireless network, such as part of a wireless gaming system. In such embodiments, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 11D:
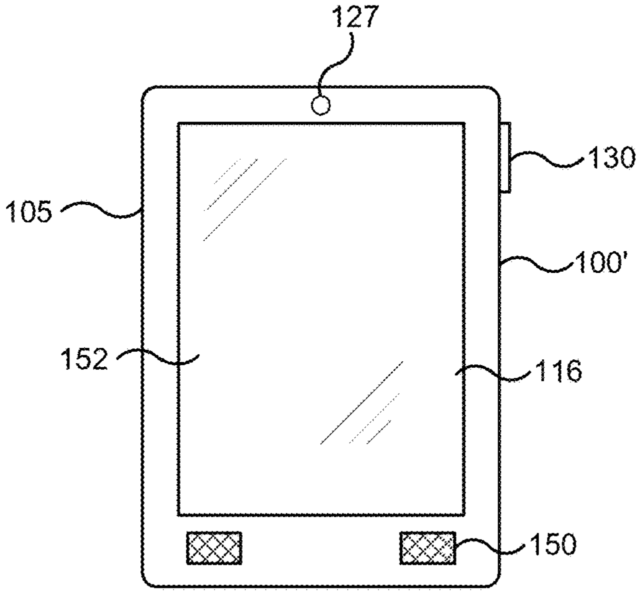

For example, referring to FIG. 11D, an EGM 100' may be implemented as a handheld device including a compact housing 105 on which is mounted a touchscreen display device 116 including a digitizer 152. An input button 130 may be provided on the housing and may act as a power or control button. A camera 127 may be provided in a front face of the housing 105. The housing 105 may include one or more speakers 150. In the EGM 100', various input buttons described above, such as the cashout button, gameplay activation button, etc., may be implemented as soft buttons on the touchscreen display device 116. Moreover, the EGM 100' may omit certain features, such as a bill acceptor, a ticket generator, a coin acceptor or dispenser, a card reader, secondary displays, a bet display, a credit display, etc. Credits can be deposited in or transferred from the EGM 100' electronically.

Figure 11E:
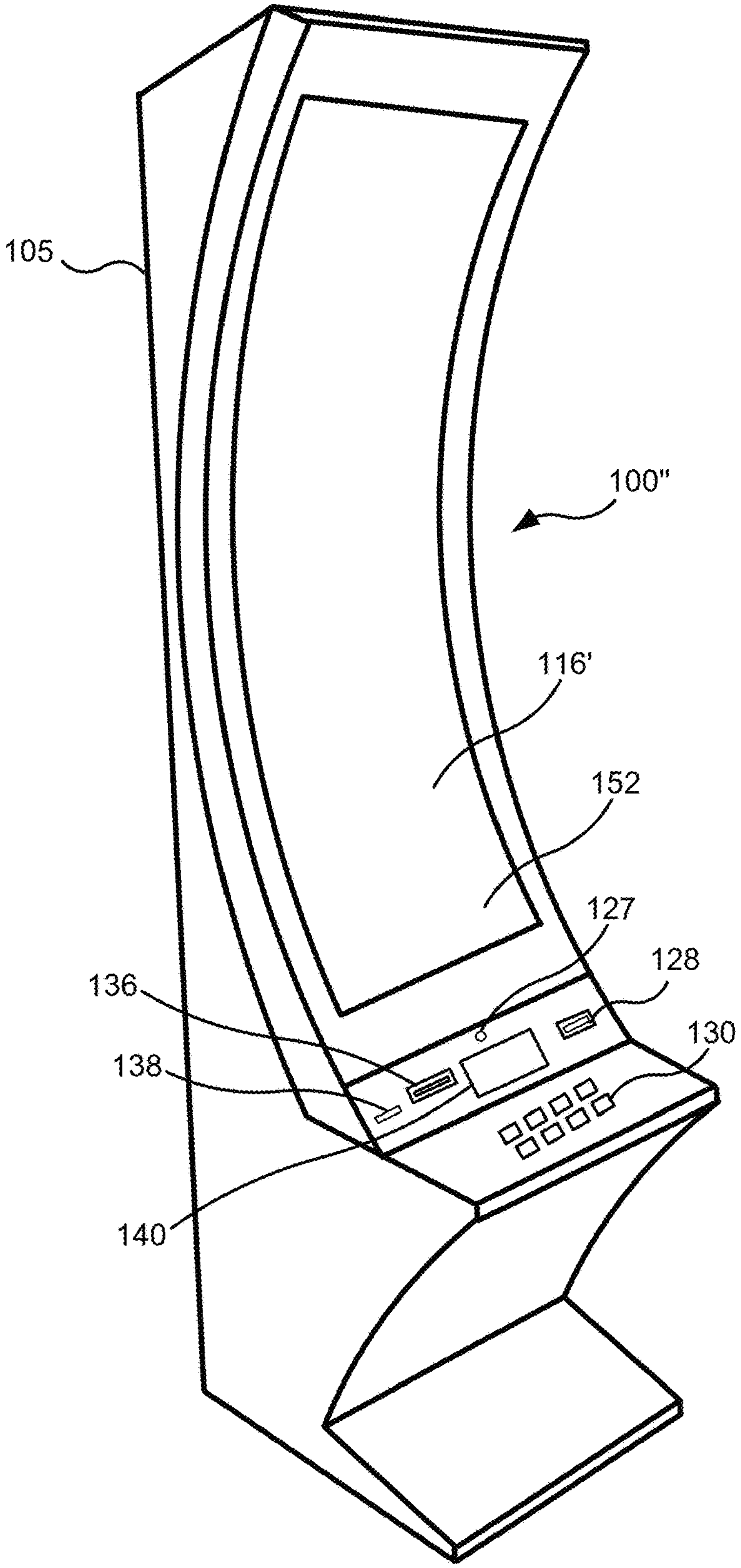

FIG. 11E illustrates a standalone EGM 100" having a different form factor from the EGM 100 illustrated in FIG. 11A. In particular, the EGM 100" is characterized by having a large, high aspect ratio, curved primary display device 116' provided in the housing 105, with no secondary display device. The primary display device 116' may include a digitizer 152 to allow touchscreen interaction with the primary display device 116'. The EGM 100" may further include a player tracking display 140, a plurality of input buttons 130, a bill/ticket acceptor 128, a card reader 138, and a ticket generator 136. The EGM 100" may further include one or more cameras 127 to enable facial recognition and/or motion tracking.

Figure 12:
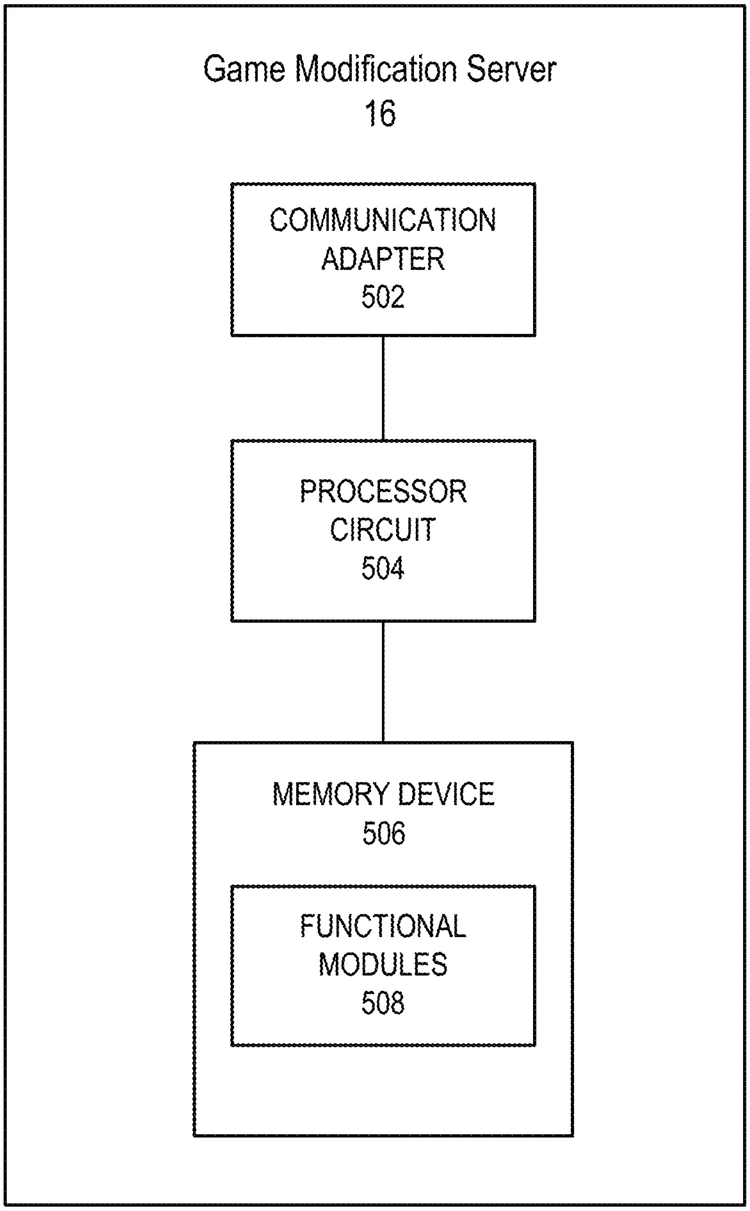
FIG. 12 is a block diagram of a game modification server according to some embodiments.

FIG. 12 is a block diagram that illustrates various components of a game modification server 16 according to some embodiments. As shown in FIG. 12, the game modification server 16 may include a processor circuit 72 that controls operations of the game modification server 16. Although illustrated as a single processor circuit, multiple special purpose and/or general purpose processor circuits and/or processor circuit cores may be provided in the game modification server 16. For example, the game modification server 16 may include one or more of a video processor, a signal processor, a sound processor and/or a communication controller that performs one or more control functions within the game modification server 16. The processor circuit 72 may be variously referred to as a "controller," "microcontroller," "microprocessor" or simply a "computer." The processor circuit may further include one or more application-specific integrated circuits (ASICs).

Various components of the game modification server 16 are illustrated in FIG. 12 as being connected to the processor circuit 72. It will be appreciated that the components may be connected to the processor circuit 72 through a system bus, a communication bus and controller, such as a USB controller and USB bus, a network interface, or any other suitable type of connection.

The game modification server 16 further includes a memory device 74 that stores one or more functional modules 76 for performing the operations described above of collecting and analyzing game play data, identifying a player behavior category based on the game play data, and adjusting game play of a game based on the identified player behavior category.

The memory device 74 may store program code and instructions, executable by the processor circuit 72, to control the game modification server 16. The memory device 74 may include random access memory (RAM), which can include non-volatile RAM (NVRAM), magnetic RAM (ARAM), ferroelectric RAM (FeRAM) and other forms as commonly understood in the gaming industry. In some embodiments, the memory device 74 may include read only memory (ROM). In some embodiments, the memory device 74 may include flash memory and/or EEPROM (electrically erasable programmable read only memory). Any other suitable magnetic, optical and/or semiconductor memory may operate in conjunction with the gaming device disclosed herein.

The game modification server 16 may include a communication adapter 78 including transceiver circuitry that enables the game modification server 16 to communicate with remote devices, such as EGMs 100 over a wired and/or wireless communication network, such as a local area network (LAN), wide area network (WAN), cellular communication network, or other data communication network.

The game modification server 16 may include one or more internal or external communication ports that enable the processor circuit 72 to communicate with and to operate with internal or external peripheral devices, such as display screens, keypads, mass storage devices, microphones, speakers, and wireless communication devices. In some embodiments, internal or external peripheral devices may communicate with the processor circuit through a universal serial bus (USB) hub (not shown) connected to the processor circuit 72.

Additional Features and Embodiments

The above-described embodiments of the present inventive concepts can be implemented in any of numerous ways. For example, the embodiments may be implemented using hardware, software or a suitable combination thereof. When implemented in software, the software code can be executed on any suitable processor or collection of processors, whether provided in a single computer or distributed among multiple computers. Such processors may be implemented as integrated circuits, with one or more processors in an integrated circuit component. Further, a processor may be implemented using circuitry in any suitable format.

It should be appreciated that a computer may be embodied in any of a number of forms, such as a rack-mounted computer, a desktop computer, a laptop computer, or a tablet computer. Additionally, a computer may be embedded in a device perhaps not generally regarded as a computer but with suitable processing capabilities, including an electronic gaming machine, a Web TV, a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks. As used herein, the term "online" refers to such networked systems, including computers networked using, e.g., dedicated lines, telephone lines, cable or ISDN lines as well as wireless transmissions. Online systems include remote computers using, e.g., a local area network (LAN), a wide area network (WAN), the Internet, as well as various combinations of the foregoing. Suitable user devices may connect to a network for instance, any computing device that is capable of communicating over a network, such as a desktop, laptop or notebook computer, a mobile station or terminal, an entertainment appliance, a set-top box in communication with a display device, a wireless device such as a phone or smartphone, a game console, etc. The term "online gaming" refers to those systems and methods that make use of such a network to allow a game player to make use of and engage in gaming activity through networked, or online systems, both remote and local. For instance, "online gaming" includes gaming activity that is made available through a website on the Internet.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the inventive concepts may be embodied as a tangible, non-transitory computer readable storage medium (or multiple computer readable storage media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer-readable storage media) encoded with one or more programs that, when executed on one or more computers or other processors, perform methods that implement the various embodiments of the inventive concepts discussed above. The computer readable medium or media can be transportable, such that the program or programs stored thereon can be loaded onto one or more different computers or other processors to implement various aspects of the present inventive concepts as discussed above. As used herein, the term "non-transitory computer-readable storage medium" encompasses only a computer-readable medium that can be considered to be a manufacture (i.e., article of manufacture) or a machine and excludes transitory signals.

The terms "program" or "software" are used herein in a generic sense to refer to any type of computer code or set of computer-executable instructions that can be employed to program a computer or other processor to implement various aspects of the present inventive concepts as discussed above. Additionally, it should be appreciated that according to one aspect of this embodiment, one or more computer programs that when executed perform methods of the present inventive concepts need not reside on a single computer or processor, but may be distributed in a modular fashion amongst a number of different computers or processors to implement various aspects of the present inventive concepts.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags, addresses or other mechanisms that establish relationship between data elements.

Various aspects of the present inventive concepts may be used alone, in combination, or in a variety of arrangements not specifically discussed in the embodiments described in the foregoing and the concepts described herein are therefore not limited in their application to the details and arrangement of components set forth in the foregoing description or illustrated in the drawings. For example, aspects described in one embodiment may be combined in any manner with aspects described in other embodiments.

Also, the inventive concepts may be embodied as a method, of which several examples haves been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While the inventive concepts has been described with reference to certain exemplary embodiments thereof, those skilled in the art may make various modifications to the described embodiments of the inventive concepts without departing from the true spirit and scope of the inventive concepts. The terms and descriptions used herein are set forth by way of illustration only and not meant as limitations. In particular, although the present inventive concepts has been described by way of examples, a variety of devices would practice the inventive concepts described herein. Although the inventive concepts has been described and disclosed in various terms and certain embodiments, the scope of the inventive concepts is not intended to be, nor should it be deemed to be, limited thereby and such other modifications or embodiments as may be suggested by the teachings herein are particularly reserved, especially as they fall within the breadth and scope of the claims here appended. Those skilled in the art will recognize that these and other variations are possible within the spirit and scope of the inventive concepts as defined in the following claims and their equivalents.

What is claimed is:

1. An electronic gaming machine (EGM) comprising:

a processor circuit; and a memory coupled to the processor circuit, the memory comprising machine-readable instructions that, when executed by the processor circuit cause the processor circuit to:

initiate a wagering game on the EGM, wherein the wagering game operates according to a set of game rules comprising game flow rules that define a sequence of game events that are presented to a player in a course of operation of the wagering game, a math engine that governs probabilities of pseudorandom events that can occur in the course of operation of the wagering game, and a pay table that defines winning events that can occur in the course of operation of the wagering game and corresponding payouts that are made to the player upon occurrence of the winning events, wherein the pay table, the math engine and the game flow rules provide payouts having a return to player (RTP), over time, that falls within a predetermined window;

adjust the game flow rules from a first set of game flow rules to a second set of game flow rules in response to a determined player game play preference;

present the wagering game to the player using the second set of game flow rules while maintaining the RTP within the predetermined window;

receive an initial player game play preference from a remote server, the initial player game play preference being associated with an additional set of data for an additional period of game play separate from the wagering game; and determine the player game play preference based on the initial player game play preference and the player game play preference of the player associated with playing the wagering game on the EGM, responsive to initiating the wagering game, present the wagering game to the player using the first set of game flow rules;

responsive to presenting the wagering game to the player using the first set of game flow rules, collect a first set of player game play preference data related to play of the wagering game by the player; and analyze the first set of player game play preference data to determine the game play preference of the player based on analysis of the first set of player game play preference data, wherein the first set of player game play preference data represents wagering behavior of the player during play of the wagering game.

2. The EGM of claim 1, the memory further comprising machine-readable instructions that, when executed by the processor circuit, cause the processor circuit to:

maintain the RTP within the predetermined window by adjusting the math engine to compensate for changes in the game flow rules.

3. The EGM of claim 1, the memory further comprising machine-readable instructions that, when executed by the processor circuit, cause the processor circuit to:

maintain the RTP within the predetermined window by adjusting the pay table to compensate for changes in the game flow rules.

4. The EGM of claim 1, wherein the player game play preference comprises a preference for playing bonus games, and wherein the game flow rules are adjusted to present an increased number of bonus games to the player.

5. The EGM of claim 1, wherein the player game play preference comprises a preference for maximizing playing time.

6. The EGM of claim 5, wherein the game flow rules are adjusted to cause the game play to last longer.

7. The EGM of claim 1, wherein the player game play preference comprises a preference for achieving in-game goals.

8. The EGM of claim 7, wherein the game flow rules are adjusted to provide more in-game goal completion opportunities to the player.

9. The EGM of claim 1, wherein the player game play preference comprises a preference for playing the same game.

10. The EGM of claim 9, wherein the game flow rules are adjusted to reduce bonus game opportunities.

11. The EGM of claim 1, the memory further comprising machine-readable instructions that, when executed by the processor circuit, cause the processor circuit to:

collect the player game play preference data from a moment the player begins to play the wagering game or indicates a desire to play the wagering game on the EGM.

12. The EGM of claim 1, the memory further comprising machine-readable instructions that, when executed by the processor circuit, cause the processor circuit to collect player game play preference data for a predetermined length of time.

13. A method, comprising:

initiating a wagering game on an electronic gaming machine (EGM), wherein the wagering game operates according to a set of game rules including game flow rules that define a sequence of game events that are presented to a player in a course of operation of the wagering game, a math engine that governs probabilities of pseudorandom events that can occur in the course of operation of the wagering game, and a pay table that defines winning events that can occur in the course of operation of the wagering game and corresponding payouts that are made to the player upon occurrence of the wining events, wherein the pay table, the math engine and the game flow rules provide payouts having a return to player (RTP), over time, that falls within a predetermined window;

responsive to initiating the wagering game on the EGM, determining a player game play preference of the player associated with playing the wagering game on the EGM based on play of the wagering game by the player;

adjusting the game flow rules from a first set of game flow rules to a second set of game flow rules in response to the determined player game play preference;

presenting the wagering game to the player using the second set of game flow rules while maintaining the RTP within the predetermined window; and receiving an initial player game play preference from a remote server, the initial player game play preference being associated with an additional set of data for an additional period of game play separate from the wagering game;

responsive to initiating the wagering game, present the wagering game to the player using the first set of game flow rules;

responsive to presenting the wagering game to the player using the first set of game flow rules, collecting a first set of player game play preference data related to play of the wagering game by the player; and analyzing the first set of data to determine the game play preference of the player based on analysis of the first set of player game play preference data.

14. The method of claim 13, further comprising maintaining the RTP within the predetermined window by adjusting the math engine to compensate for changes in the game flow rules.

15. The method of claim 13, further comprising:

maintaining the RTP within the predetermined window by adjusting the pay table to compensate for changes in the game flow rules.

16. The method of claim 13, wherein the player game play preference comprises a preference for playing bonus games, a preference for maximizing playing time, a preference for achieving in-game goals, and/or a preference for playing the same game.

17. An electronic gaming machine (EGM) comprising:

a processor circuit; and a memory coupled to the processor circuit, the memory comprising machine-readable instructions that, when executed by the processor circuit cause the processor circuit to:

initiate a game on the EGM, wherein the game operates according to a set of game rules including comprising game flow rules that define a sequence of game events that are presented to a player in a course of operation of the game, a math engine that governs probabilities of pseudorandom events that can occur in the course of operation of the game, and a win table that defines winning events that can occur in the course of operation of the game and corresponding rewards that are made to the player upon occurrence of the winning events;

adjust the game flow rules from a first set of game flow rules to a second set of game flow rules in response to the determined player game play preference;

adjust the math engine to compensate for changes in the game flow rules;

present the game to the player using the second set of game flow rules;

receive an initial player game play preference from a remote server, the initial player game play preference being associated with an additional set of data for an additional period of game play separate from the wagering game; and determine the player game play preference based on the initial player game play preference and the player game play preference of the player associated with playing the wagering game on the EGM, cause the processor circuit to collect player game play preference data for a predetermined length of time.

* * * * *